United States Patent [19]
Beck et al.

[11] Patent Number: 5,526,786
[45] Date of Patent: Jun. 18, 1996

[54] DUAL FUEL ENGINE HAVING GOVERNOR CONTROLLED PILOT FUEL INJECTION SYSTEM

[75] Inventors: Niels J. Beck, Bonita; Robert L. Barkhimer, Poway; William E. Weseloh, San Diego, all of Calif.

[73] Assignee: Servojet Products International, San Diego, Calif.

[21] Appl. No.: 377,279

[22] Filed: Jan. 23, 1995

[51] Int. Cl.$^6$ .................................................. F02M 21/02
[52] U.S. Cl. ...................... 123/357; 123/27 GE; 123/526
[58] Field of Search .............................. 123/27 GE, 526, 123/525, 575, 357

[56] References Cited

U.S. PATENT DOCUMENTS

| | | | |
|---|---|---|---|
| 2,708,916 | 5/1955 | Davids | 123/526 |
| 4,603,674 | 8/1986 | Tanaka | 123/575 |
| 4,640,245 | 2/1987 | Matsuda et al. | 123/395 |
| 4,757,791 | 7/1988 | Hachitani et al. | 123/357 |
| 4,817,568 | 4/1989 | Bedford | 123/27 GE |
| 5,224,457 | 7/1993 | Arsenault et al. | 123/27 GE |
| 5,315,981 | 5/1994 | Chen | 123/27 GE |
| 5,355,854 | 10/1994 | Aubee | 123/27 GE |
| 5,370,097 | 12/1994 | Davis | 123/27 GE |
| 5,408,957 | 4/1995 | Crowley | 123/27 GE |

*Primary Examiner*—Erick R. Solis
*Attorney, Agent, or Firm*—Nilles & Nilles

[57] ABSTRACT

A compression ignition engine can be quickly and easily converted into a dual fuel engine simply by adding a gaseous fuel supply system, by disconnecting the governor actuating lever from the throttle pedal, and by adding an electronic controller which controls the operation of the gaseous fuel supply system and which sets the governor actuating lever at a position which causes the engine to deliver pilot fuel at a desired quantity. Operation is simplified by setting the governor using a droop control technique inherent in governor operation. The system can be automatically calibrated to assure the supply of fuel at a precisely controlled quantity per stroke at all engine speeds. The pilot fuel injection system of the resulting engine is non-invasive and permits inherent safety features of the governor to be retained.

19 Claims, 4 Drawing Sheets

DUAL FUEL ENGINE HAVING GOVERNOR CONTROLLED PILOT FUEL INJECTION SYSTEM

BACKGROUND OF THE INVENTION

1. Field of the Invention

The invention relates to dual fuel engines and, more particularly, relates to a non-invasive system for controlling the supply of pilot fuel to a dual fuel engine by governor control and to a method of using such a system.

2. Discussion of the Related Art

Recent years have seen an increased demand for the use of gaseous fuels as a primary fuel source in compression ignition engines. Gaseous fuels such as propane or natural gas are considered by many to be superior to diesel fuel and the like because gaseous fuels are generally less expensive, provide equal or greater power with equal or better mileage, and produce significantly lower emissions. This last benefit renders gaseous fuels particularly attractive because recently enacted and pending worldwide regulations may tend to prohibit the use of diesel fuel in many engines. The attractiveness of gaseous fuels is further enhanced by the fact that existing compression ignition engine designs can be readily adapted to burn gaseous fuels.

One drawback of gaseous fuels is that they exhibit significantly higher autoignition temperatures than do diesel fuel, oil, and other liquid fuels traditionally used in compression ignition engines. Accordingly, the temperature of the gaseous fuels does not increase sufficiently during operation of standard compression ignition engines for self-ignition. This problem is overcome by injecting a small charge of a pilot fuel, typically diesel fuel, into the combustion cylinders of the engine in the presence of a charge of a compressed gaseous fuel/air mixture. The pilot fuel is distributed throughout the gas/air mixture, ignites upon injection and subsequent compression, and burns at a high enough temperature to ignite the gaseous fuel charge.

The cost of convening a pre-assembled compression ignition engine to a dual fuel engine or of assembling a new dual fuel engine can be minimized by employing the stock diesel fuel injection components of the engine as a pilot fuel supply system and by merely adding a gaseous fuel supply system to the otherwise unmodified diesel engine. In the case of engines employing rack-controlled high pressure in-line pumps for the supply of diesel fuel to liquid fuel injectors, this conversion has traditionally entailed the removal of the stock mechanical or electronic governor and the direct control of the rack using a pneumatic or hydraulic actuator. The actuator is controlled, based upon sensed engine operating parameters, to position the rack so as to deliver diesel pilot fuel to the cylinders at a quantity per stroke demanded by the instantaneous engine operating conditions. This technique, while effective, exhibits marked drawbacks and disadvantages.

First, it is relatively complex and invasive. The existing governor must be removed and the existing pump disassembled and modified to provide access to the rack by the actuator. In the case of a retrofit operation, this conversion may necessitate the removal of the entire engine from the associated vehicle and render retro-fitting cost prohibitive. Second, elimination of an existing governor necessarily eliminates the inherent safety features of the governor, namely, the setting of minimum and maximum fuel delivery quantities per stroke independently of governor actuating lever position.

OBJECTS AND SUMMARY OF THE INVENTION

It is therefore an object of the invention to control the supply of pilot fuel to a dual fuel engine with only minimal modifications to the stock engine design and without eliminating safety features provided by the governor of the engine.

This object is achieved by controlling pilot fuel injection by governor input command rather than pump rack control. The method includes first providing a dual fuel internal combustion engine which includes a combustion cylinder, a primary fuel supply system which supplies a gaseous fuel to the combustion cylinder, a pilot fuel supply system which supplies a liquid pilot fuel to the combustion cylinder and which includes a pump and a fuel supply rack which is connected to the pump and which is movable to vary the fuel delivery quantity per stroke of the pump, and a governor which sets the position of the rack. Subsequent steps include commanding an engine operating condition, determining a pilot liquid fuel delivery quantity per stroke required for the commanded engine operating condition, and then automatically controlling the governor in-put command to move the rack to a position which causes the pump to deliver liquid fuel at the desired quantity per stroke.

Preferably, the controlling step comprises automatically displacing an actuating lever of the governor, and the displacing step comprises actuating a piston and cylinder device to which the actuating lever is coupled.

Control of pilot fuel injection using a stock governor requires knowledge or at least an estimate of fuel delivery quantity versus governor position at various engine speeds. Precise control of pilot fuel injection can be facilitated by calibrating the system based upon the operational characteristics of the governor, and it is therefore another object of the invention to provide a method of automatically calibrating a pilot fuel supply system in this manner.

This object is achieved by sensing governor actuating lever positions at designated liquid fuel delivery quantities per stroke and storing the sensed positions in an electronic memory. Preferably the calibrating operation further comprises sensing engine speeds under engine operating conditions at which liquid fuel delivery quantities per stroke required to obtain the engine speeds are known, sensing governor actuating lever positions at each of the sensed engine speeds, and creating and storing a table of governor actuating lever position versus engine speed and liquid fuel delivery quantity per stroke.

Yet another object of the invention is to convert a preassembled diesel or other compression ignition engine to a dual fuel compression ignition engine with minimal modifications to the engine.

In accordance with another aspect of the invention, this object is achieved by providing an engine which is operable in single fuel mode and which includes a combustion cylinder, a liquid fuel supply system which supplies liquid fuel to the combustion cylinder and which includes a fuel pump, a fuel supply rack which is connected to the pump and which is movable to vary the fuel delivery quantity per stroke of the pump, and a governor which sets the position of the rack. The governor includes an actuating lever which is mechanically coupled to the throttle pedal and the position of which determines the position of the rack. Subsequent steps include detaching the governor actuating lever from the throttle pedal, adding a primary fuel supply system which supplies a gaseous fuel to the combustion cylinder, and adding an electronically controlled actuator and coupling the actuator to the governor actuating lever. The actuator displaces the governor actuating lever a sufficient amount to cause the liquid fuel supply system to supply an amount of liquid pilot fuel to the combustion cylinder commanded by the controller.

Still another object of the invention is to provide a novel dual fuel engine. This object is achieved by providing a combustion cylinder, a primary fuel supply system which supplies a gaseous primary fuel to the combustion cylinder, a pilot fuel supply system, and an actuator. The pilot fuel supply system supplies a liquid pilot fuel to the combustion cylinder and includes a pump, a rack which is connected to the pump and which is movable to vary the fuel delivery quantity per stroke of the pump, and a governor which is connected to the rack, the governor including an actuating lever which is displaceable to set the position of the rack. The actuator automatically displaces the governor actuating lever to indirectly but effectively control the position of the rack and thus the fuel delivery quantity per stroke of the pump.

Still another object of the invention is to provide a system for calibrating a pilot liquid fuel supply system of a dual fuel internal combustion engine.

In accordance with still another aspect of the invention, this object is achieved by providing means for determining governor actuating lever positions at designated liquid fuel delivery quantity per strokes, and means for storing the determined positions and the designated liquid fuel delivery quantities per stroke in an electronic memory.

Preferably, the system further includes means for sensing engine speeds under engine operating conditions at which liquid fuel delivery quantities per stroke required to obtain said engine speeds are known, and the means for storing preferably comprises means for creating and storing in said memory a table of governor actuating lever position versus fuel delivery quantities per stroke and engine speeds.

Also, the converted engine retains the capability for full diesel operation and maintains diesel thermal efficiency.

These and other objects, features and advantages will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications could be made in the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

1. Resume

Pursuant to the invention, a compression ignition engine can be quickly and easily converted into a dual fuel engine simply by adding a gaseous fuel supply system, by disconnecting the governor actuating lever from the throttle pedal, and by adding an electronic controller which controls the operation of the gaseous fuel supply system and which sets the governor actuating lever at a position which causes the engine to deliver pilot fuel at a desired quantity. Operation is simplified by setting the governor using a droop control technique inherent in governor operation. The system can be automatically calibrated to assure the supply of fuel at a precisely controlled quantity per stroke at all engine speeds. The pilot fuel injection system of the resulting engine is non-invasive and permits inherent safety features of the governor to be retained.

2. Construction and Operation of Standard Compression Ignition Engine

Figure 1:
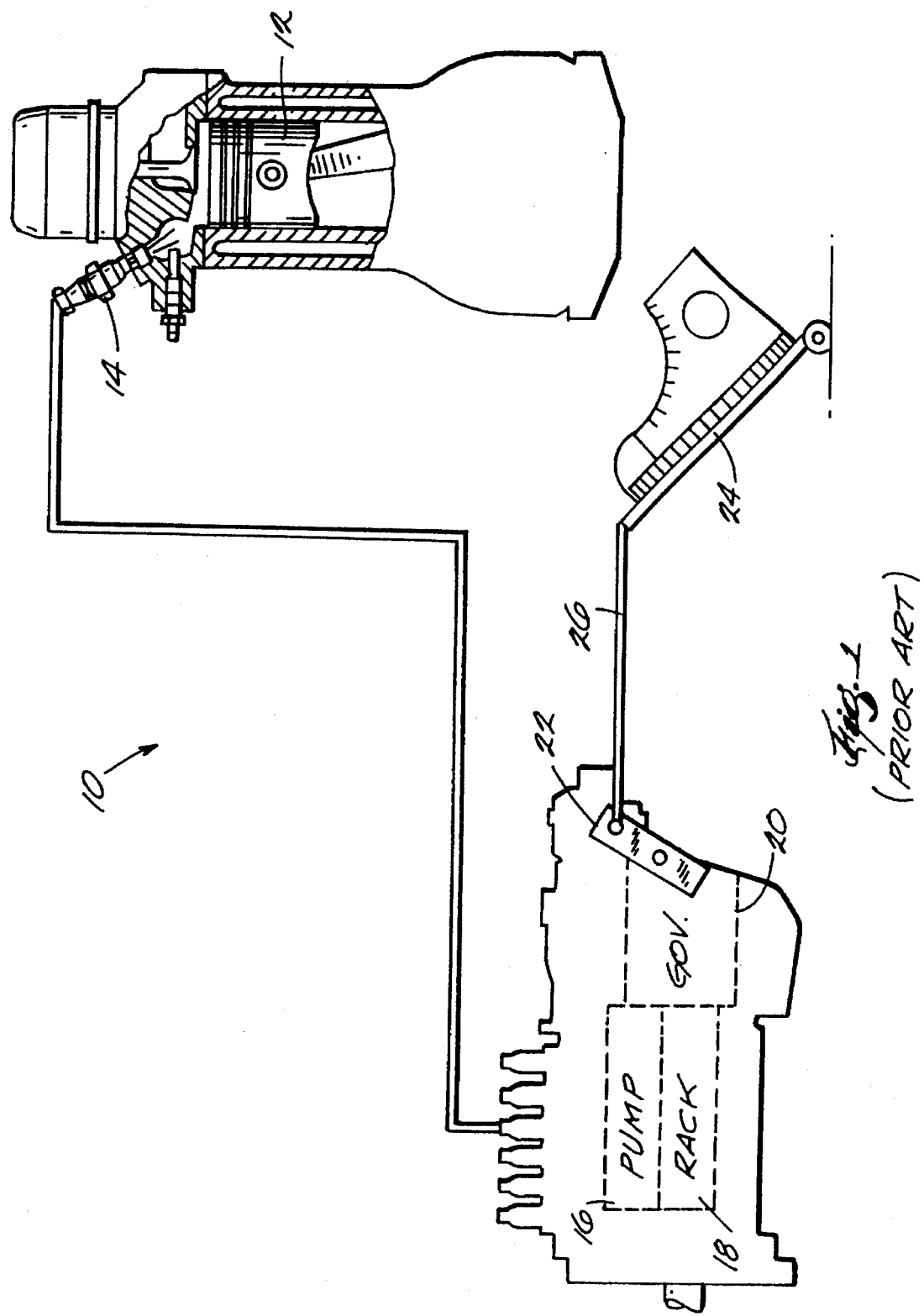
FIG. 1 schematically represents a prior art compression ignition engine, appropriately labeled "PRIOR ART"

Referring now to FIG. 1, a compression ignition engine 10 which is amenable to operation in dual fuel mode includes, as is standard in the art, a number of cylinders 12 supplied with diesel or other liquid fuel via a plurality of injectors 14 to supply torque to an output shaft (not shown). Fuel is supplied to the injectors 14 by a high pressure pump which may for example be an in-line piston pump 16. Pump 16 delivers fuel at a quantity per stroke determined by an internal rack 18 the position of which is in turn determined by the operation of a governor 20. The governor 20 may be either electronically or mechanically controlled and, in the illustrated embodiment, is a mechanically controlled governor having an actuating lever 22 connected to a throttle pedal 24 by a link 26. In the discussion that follows, "governor position" and "governor actuating lever position" will be used interchangeably, it being understood that the former is a direct function of the latter influenced only by engine speed. The manner in which the governor 20 is responsive to the throttle pedal 24 and engine speed to control delivery of fuel to the engine 10 is well known and will be described only in passing.

Figure 2:
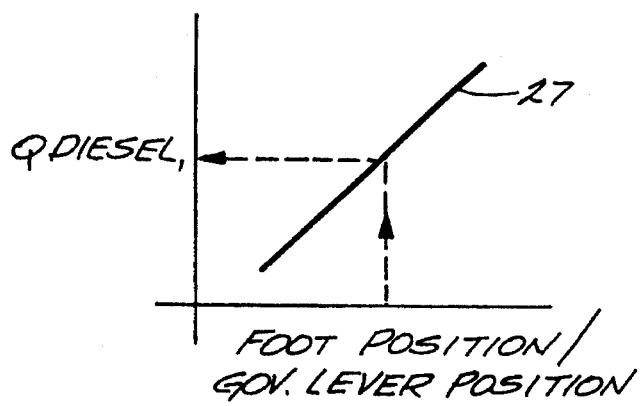
FIG. 2 is a graph illustrating the relationship between throttle pedal position/governor actuating lever position and torque or fuel delivery quantity per pump stroke, and is appropriately labeled "PRIOR ART"
Figure 3:
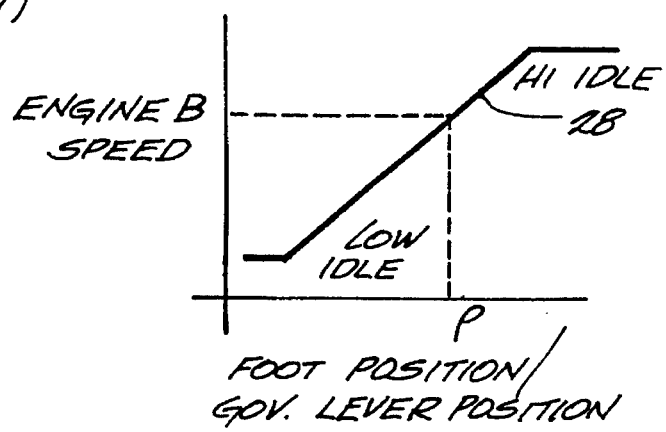
FIG. 3 is a graph illustrating the relationship between throttle pedal position/governor actuating lever position and commanded engine speed, and is appropriately labeled "PRIOR ART"

Displacement of the throttle pedal 24 indicates a command for an increased engine torque requiring an increase in fuel as represented by the curve 27 in FIG. 2. Displacement of the throttle pedal 24 also commands an engine speed which varies with progressive displacement of the throttle pedal 24 from low idle to high idle as represented by curve 28 in FIG. 3. Hence, displacing the throttle pedal 24 and thus the governor actuating lever 22 to the position P will command an engine speed B. It is significant to note that the low idle and high idle speed values are independent of throttle pedal position and thus define a safe operating range which will not be exceeded by the engine 10 even if the relationship between the throttle pedal 24 and the governor 20 is somehow disturbed, e.g., by severing the link 26.

Figure 4:
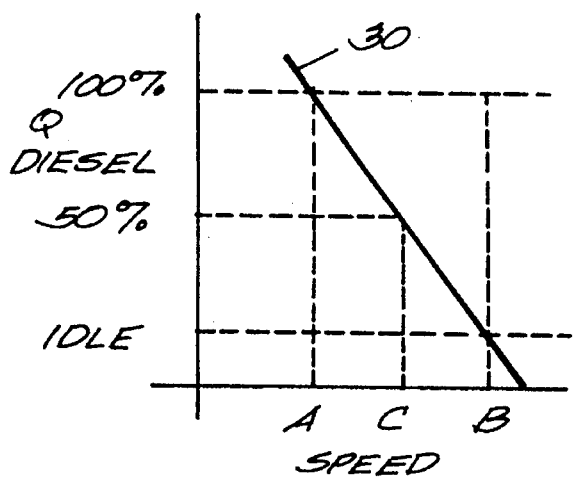
FIG. 4 is a graph representing engine speed versus fuel delivery quantity for a particular governor actuating lever position of the engine of FIG. 1, and is appropriately labeled "PRIOR ART"

Conventional mechanical governors operate to control the pump rack 18 to vary the fuel delivery quantity per stroke or fuel delivery quantity per stroke of the pump 16 based upon droop. Droop is defined as the percentage difference between commanded engine speed and actual engine speed in relation to a given throttle pedal and governor settings. The quantity of fuel required per pump stroke at a designated governor actuating lever position to increase actual engine speed to commanded engine speed increases proportionally with this droop. Thus, as represented by the curve 30 in FIG. 4, centrifugal weights or other internal control mechanisms of the governor 20 control the rack 18 to increase fuel delivery quantity per stroke from IDLE to 100% of maximum based on the percentage difference between a commanded engine speed B and the actual engine speed. If the actual speed is equal to or greater than the commanded speed B, there is no need to supply additional power to the engine 10, and the governor 20 sets the rack 18 to maintain fuel delivery quantity per stroke at IDLE. However, if the actual engine speed decreases due to increased load, the amount of fuel required to increase engine speed to the commanded speed B increases, and the governor 20 adjusts the rack position to increase the amount of fuel delivered per pump stroke by an amount equal to the droop or percentage difference between the commanded engine speed B and the actual engine speed. Thus, if the droop between the commanded engine speed B and an actual engine speed C is 50%, the governor 20 will control the rack 18 to deliver fuel at a rate of 50% of the maximum quantity per pump stroke. If the droop between the commanded engine speed B and an actual engine speed A is 100% or greater, the governor 20 will control the rack 18 to deliver fuel at a rate of 100% of the maximum quantity per pump stroke. It should be noted that the curve 30 of FIG. 4 is but one of a family of curves each of which represents droop control at a different constant governor actuating lever position.

It has been discovered that the relationship between commanded speed, governor position, and fuel delivery quantity per pump stroke can be used to automatically control a governor to deliver a pilot fuel at a desired quantity per stroke if engine speed is known. A process and system for effecting such control will now be described.

Figure 5:
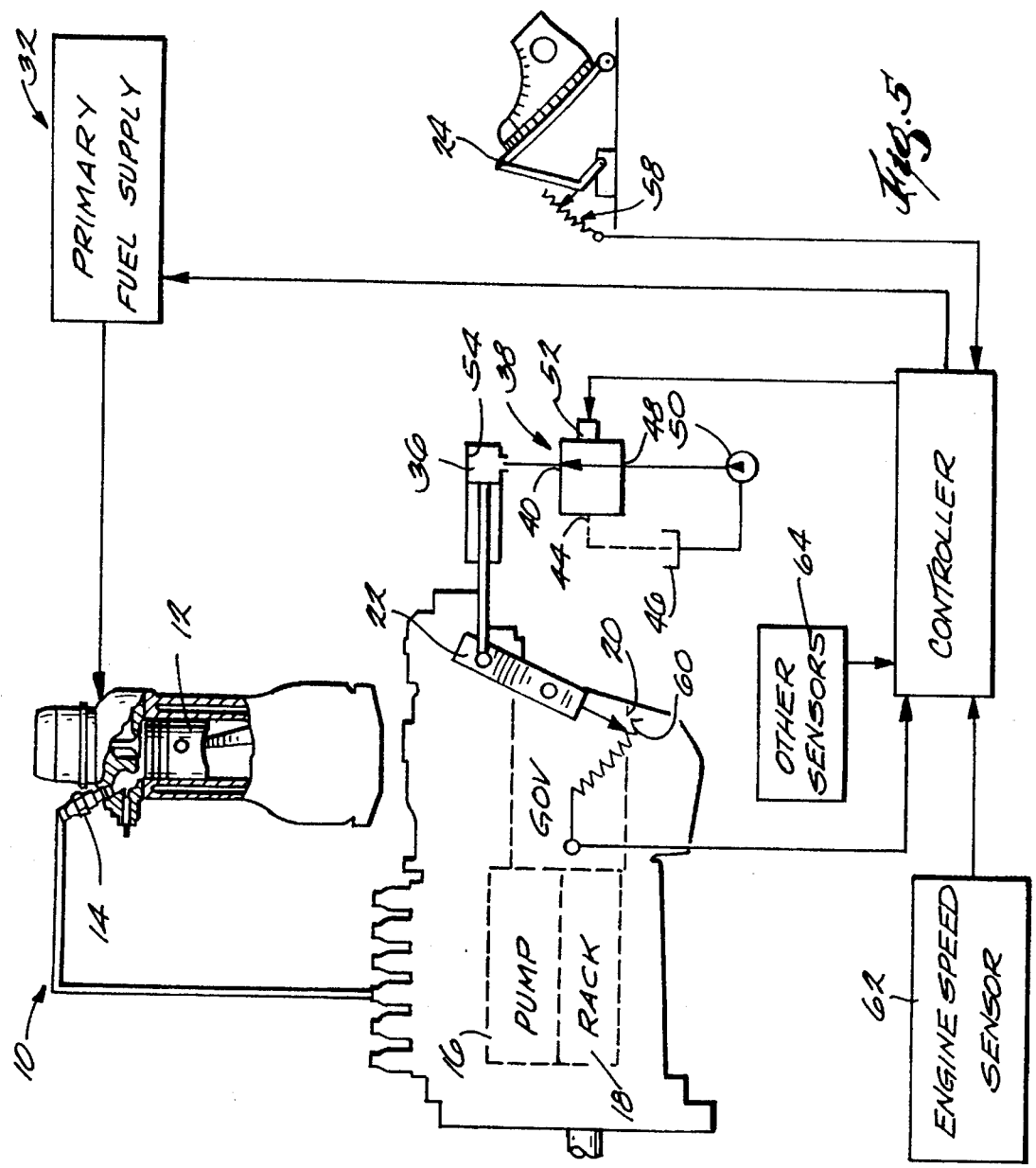
FIG. 5 schematically illustrates a dual fuel engine producible through conversion of the engine of FIG. 1.

3. Construction and Operation of Dual Fuel Engine Having Governor Controlled Pilot Fuel Injection System Referring to FIG. 5, the engine 10 of FIG. 1 can be modified to function as a dual fuel engine simply by adding a primary fuel supply system 32 (typically comprising a compressed natural gas or CNG supply system) and a corresponding controller 34 and by controlling the governor 20 by the controller 34 rather than by the throttle pedal 24 so that the diesel or other liquid fuel supply system functions as a pilot fuel supply system. The engine 10 remains essentially unchanged and includes the cylinders 12, the injectors 14, the output shaft, the pump 16 including the rack 18, and the governor 20. The engine 10 is modified only by replacing the mechanical link 26 of FIG. 1 with an actuator 36, by adding the primary fuel supply system 32, and by adding the controller 34 and associated sensors.

The primary fuel supply system 32 could supply gaseous fuel to the engine manifold via a single metering valve but preferably comprises a plurality of electronically controlled CNG injectors emptying into the intake ports of the respective cylinders 12 and receiving gas from a common gas manifold connected to a conventional source. The gaseous fuel thus supplied could be natural gas, propane, or any other suitable gaseous fuel.

The actuator 36 may comprise a pneumatic cylinder, an electric actuator, or any device which displaces the lever 22 of the governor 20 under action of the controller 34 and preferably comprises either a single or a double acting hydraulic cylinder. In the illustrated embodiment, the actuator comprises a single acting hydraulic cylinder 36 controlled by a valve 38. The valve 38 is a two position three-way proportional solenoid valve having a control port 40 connected a cylinder end 54 of the cylinder 36, a discharge port 44 emptying into a tank 46, and a supply port 48 which receives pressurized fluid from the tank 46 via a pump 50. A solenoid coil 52 receives electrical current from the controller 34 to modulate the valve 38 to set the pressure in the cylinder end 54 of cylinder 36 at a designated, variable level and hence setting the lever 22 a designated position.

The controller 34 may comprise any electronic device capable of monitoring engine operation and of controlling the primary and pilot fuel supply systems and, in the illustrated embodiment, comprises a programmable digital microprocessor or electronic control unit (ECU) having a RAM, ROM, BUSS, and conventional peripheral devices preferably including an interface connection for a lap-top computer. ECU 34 receives signals indicative of throttle position or power command, governor actuating lever position, and engine speed from respective sensors 58, 60, and 62. ECU 34 also receives signals from additional sensors such as an intake manifold pressure sensor, an air charge temperature sensor, and a gaseous fuel composition sensor (collectively denoted by block 64) and combines these signals and the signals from sensors 58, 60 and 62 (1) to set the desired delivery quantities of primary fuel and pilot fuel based upon instantaneous operating conditions and to (2) control the primary fuel supply system 32 and the pilot fuel supply system accordingly. The manner in which the primary fuel supply system 32 is operated and in which the primary and pilot fuel delivery quantities are commanded are, per se, well known and will not be described in further detail. The manner in which the governor 20 is controlled to supply pilot fuel at the commanded quantity per stroke will now be detailed.

Figure 8:
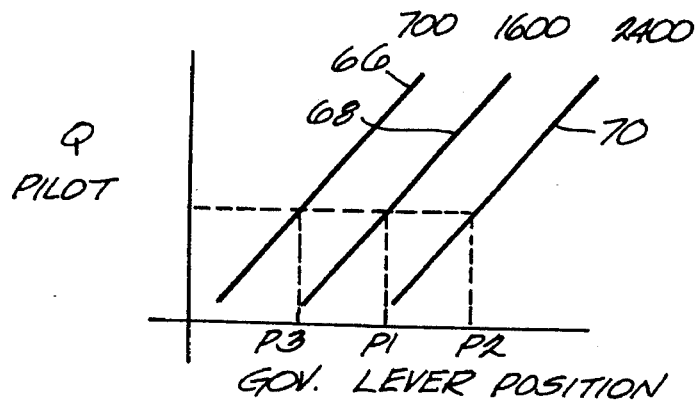
FIG. 8 is a graph of governor actuating lever position versus pilot fuel delivery quantity for the engine in FIG. 5.

Referring again to FIG. 4, the diesel fuel delivery quantity $Q_{diesel}$ supply per pump stroke can be determined at a designated governor position and a designated actual engine speed. For instance, at a designated governor position represented by the curve 30 and at a designated actual engine speed C, the fuel delivery quantity per stroke is known to be 50% of a known quantity per stroke. It is then a simple matter to create a map storing pilot fuel quantities at various governor actuating lever positions and engine speeds as illustrated by the family of curves 66, 68 and 70 in FIG. 8, and to set the governor actuating lever position to control the rack 18 and the pump 16 to supply a commanded pilot fuel quantity per stroke. Thus, assuming that the engine speed as detected by sensor 62 is 1,600 RPM, and assuming that the quantity of pilot fuel per stroke commanded by the controller is at a level Q1, the controller 34 can use the curve 68 to determine the governor actuating lever position P1 required to supply the desired amount of fuel Q1 per stroke at the sensed actual engine speed. Controller or ECU 34 then displaces the governor actuating lever 22 accordingly using the actuator 36 and feedback from the sensor 60. FIG. 8 also illustrates that different governor actuating lever positions P2 or P3 would be required to provide this same injection quantity Q1 if the actual engine speed as detected by sensor were at 700 or 2400 RPM.

Figure 6:
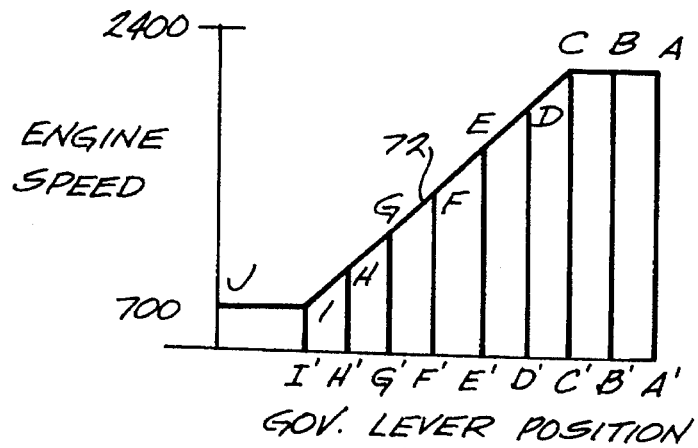
FIGS. 6 and 7 are graphs of governor actuating lever position versus engine speed and fuel delivery quantity for the dual fuel engine of FIG. 5.
Figure 7:
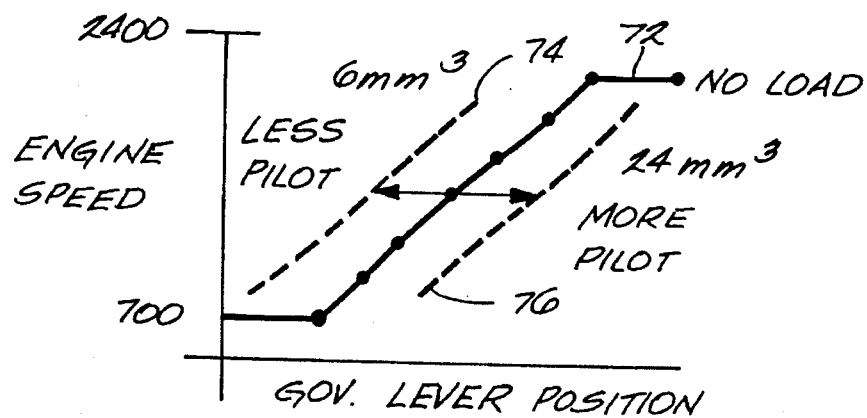

The map of pilot fuel supply quantity per stroke versus governor actuating lever position and engine speed as represented graphically in FIG. 8 is stored in the RAM of the ECU 34 and is generated based upon sensed operating conditions of a particular governor 20 using droop principals as discussed in Section 2 above. The data required for generation of this map could be obtained entirely theoretically based upon information about the governor 20 and engine 10 obtained from the respective manufacturers. However, in order to control more precisely the supply of pilot fuel to the engine 10, the system is preferably automatically precalibrated, and the data from this autocalibration is used to create the map illustrated by the curves in FIG. 8 using droop principles as described above. A curve 72 producible through the autocalibration routine is illustrated in FIG. 6 and illustrates fuel delivery quantities per pump stroke and governor actuating lever positions A'–J' under no-load conditions at designated engine speeds A–J ranging from 700–2400 RPM. Curve 72 is reproduced as Table A and is obtained as follows:

First, a lap-top computer (not shown) or some other external device is coupled to the controller 34, the transmission (not shown) is placed in neutral to place the engine 10 under a no-load condition, and an internal routine of the external device commands the engine 10 to run on liquid fuel only. A governor actuating lever position A' is then detected at a first engine speed A. Fuel delivery quantity per stroke as a function of engine speed is easily obtainable either through measurement or through data available from the engine manufacturer, thus permitting the determination of pilot fuel supply quantity per stroke at the governor actuating lever position A'. The values A, A', and pilot fuel quantity per stroke are then stored in the ECU RAM, and the measurements are repeated at engine speeds B–J commanded by the controller 34 to create the autocalibration curve 72. It is then a simple matter to shift mathematically the autocalibration curve to the left or to the right as illustrated by the phantom curves 74 and 76 in FIG. 7, using droop principals, to calculate fuel delivery quantities per stroke through the full range of engine speeds and governor actuating lever positions. This data can then be tabulated into the map represented graphically in FIG. 8 which, as discussed above, can be used to set the governor actuating lever position to supply a commanded pilot fuel quantity per stroke.

The autocalibration operation need only be done once—during assembly of the governor controlled pilot fuel supply system. A default value for curve 72 should be permanently stored in the ECU RAM should calibration be neglected or should the autocalibration data be lost, e.g., through a sudden and complete loss of power to the ECU.

The governor controlled pilot fuel supply system described above, being noninvasive, is simpler to construct and to install and is thus more readily adapted to a retrofit operation than are conventional rack controlled pilot injection systems. Moreover, minimum and maximum fuel delivery quantities per stroke are retained by the internal control mechanisms of the governor 20 even in the event of controller failure or actuator failure. This important safety feature is eliminated when the governor is eliminated or modified during construction of conventional rack controlled systems.

Many changes and modifications could be made to the invention without departing from the spirit thereof. For instance, although the invention is described in conjunction with an in-line pump and a mechanical governor, the inventive governor controlled pilot fuel supply system and method are equally applicable to other pumps and to electronically controlled governors, so long as the governors operate on the principal of droop. In addition the engine governor can be used to control the illustrated engine or an engine lacking a gaseous fuel injection system in diesel only mode. Furthermore, while the invention has been discussed primarily in conjunction with mechanical governors and racks, it is equally applicable to electronic controlled governors and racks. The scope of these and other changes will become apparent from the appended claims.

TABLE A

| ENGINE RPM | GOVERNOR LEVER POSITION | Q(MM/STROKE) |
| --- | --- | --- |
| 2400 | A, B, C, | 16 |
| 2200 | D | 14 |
| 1900 | E | 12 |
| 1600 | F | 11 |
| 1300 | G | 10.5 |
| 1000 | H | 10.0 |
| 700 | I, J | 9.5 |

We claim:
1. A method comprising:
(A) providing a dual fuel internal combustion engine which includes
(1) a combustion cylinder,
(2) a primary fuel supply system which supplies a primary gaseous fuel to said combustion cylinder,
(3) a pilot fuel supply system which supplies a liquid pilot fuel to said combustion cylinder and which includes a pump and a fuel supply rack which is connected to said pump and which is movable to vary the fuel delivery quantity per stroke of said pump, and
(4) a governor, wherein said governor includes an actuating lever the position of which determines the position of said rack and a portion of which is positioned externally of said engine;
(B) commanding an engine operating condition;
(C) sensing engine operating conditions;
(D) determining, based upon said steps (B) and (C), a desired pilot liquid fuel delivery quantity per stroke required for the commanded engine operating condition;
(E) determining, based upon said steps B and C, a desired primary gaseous fuel delivery rate required for the commanded engine operating condition;
(F) supplying said primary fuel to said combustion cylinder from said primary fuel supply system at said desired primary fuel delivery rate;
(G) determining, based upon said step (D), a governor setting required to cause said pump to supply said pilot liquid fuel at said desired pilot liquid fuel delivery quantity per stroke; and
(H) during said step (F), automatically displacing said portion of said governor actuating lever to move said rack to a position which causes said pump to deliver said pilot liquid fuel at said desired quantity per stroke, wherein said steps (F) and (H) continue during engine speed changes.

2. A method as defined in claim 1, wherein said displacing step comprises actuating a piston and cylinder device to which said actuating lever is coupled.

3. A method as defined in claim 1, wherein said determining step comprises sensing a throttle pedal position and engine speed.

4. A method as defined in claim 3, further comprising sensing a governor actuating lever position.

5. A method as defined in claim 1, further comprising calibrating said system by determining governor actuating lever positions providing designated pilot liquid fuel delivery quantities per stroke under designated engine operating conditions.

6. A method as defined in claim 5, wherein said calibrating step further comprises
   (1) sensing engine speeds under engine operating conditions at which liquid fuel delivery quantities per stroke required to obtain said engine speeds are known,
   (2) sensing governor actuating lever positions at each of the sensed engine speeds, and
   (3) creating and storing a table of governor actuating lever position versus engine speed and liquid fuel delivery quantity per stroke.

7. A method as defined in claim 1, wherein said step of commanding an engine operating condition comprises displacing a throttle pedal to command an engine speed.

8. A method comprising:
   (A) determining a desired pilot liquid fuel delivery quantity per stroke required for a commanded engine operating condition for a dual fuel engine, said engine being fueled primarily by a gaseous fuel; and then
   (B) automatically controlling a governor of said engine to cause a pump of said engine to deliver said liquid fuel at said desired quantity per stroke, wherein said governor is a type which is designed to use a principle of governor droop to set said pump at a position required to cause an actual engine speed to approach a commanded engine speed, wherein said step (B) is performed while said gaseous fuel is being supplied to said engine, and wherein said gaseous fuel and said pilot liquid fuel continue to be supplied to said engine during engine speed changes.

9. A method of calibrating a pilot liquid fuel supply system of a dual fuel internal combustion engine, comprising sensing governor actuating lever positions at designated liquid fuel delivery quantities per stroke and storing the sensed positions in an electronic memory, wherein said calibrating step further comprises
   (1) sensing engine speeds under engine operating conditions at which liquid fuel delivery quantities per stroke required to obtain said engine speeds are known,
   (2) sensing governor actuating lever positions at each of the sensed engine speeds, and
   (3) creating and storing in said memory a table of governor actuating lever position verse liquid fuel delivery quantity per stroke and engine speed.

10. A method comprising:
(A) providing an internal combustion engine which includes
   (1) a combustion cylinder;
   (2) a pilot fuel supply which supplies a liquid fuel to said combustion cylinder and which includes a pump and fuel supply rack which is connected to said pump and which is movable to vary the fuel delivery quantity per stroke of said pump,
   (3) a primary fuel supply system which supplies a primary gaseous fuel to said combustion cylinder, and
   (4) a governor which includes and actuating lever the position of which determines the position of said rack and a portion of which is positioned externally of said engine, said governor being of a type which is designed to use a principle of governor droop to said said rack at a position required to cause an actual engine speed to approach a commanded engine speed;
(B) commanding an engine operating condition;
(C) electronically determining a pilot liquid fuel delivery quantity per stroke required for the commanded engine operating condition; and
(D) determining, based upon said step B, a desired primary fuel delivery rate required for the commanded engine operating condition;
(E) supplying said primary gaseous fuel to said combustion cylinder from said primary fuel supply system at said desired primary fuel delivery rate;
(F) automatically and electronically controlling an actuator, coupled to said portion of said governor actuating lever, to displace said governor actuating lever to move said rack to a position which causes said pump to deliver said pilot liquid fuel at said desired quantity per stroke, wherein said steps (E) and (F) continue during engine speed changes.

11. A method of converting an internal combustion engine from single fuel mode to dual fuel mode, said method comprising
(A) providing an engine which is operable in single fuel mode and which includes
   (1) a combustion cylinder,
   (2) a liquid fuel supply system which supplies liquid fuel to said combustion cylinder and which includes a fuel pump, a fuel supply rack which is connected to said pump and which is movable to vary the fuel delivery quantity per stroke of said pump, and a governor which sets the position of said rack, said governor including an actuating lever the position of which determines the position of said rack and a portion of which is positioned externally of said engine, said governor being of a type which is designed to use a principle of governor droop to set the position of said rack at a position required to cause an actual engine speed to approach a commanded engine speed; and
   (3) a throttle pedal which is mechanically coupled to said governor actuating lever;
(B) detaching said governor actuating lever from said throttle pedal;
(C) adding a primary fuel supply system which supplies a primary gaseous fuel to said combustion cylinder;
(D) adding an electronically controlled actuator and coupling said actuator to said portion of said governor actuating lever; and
(E) adding a electronic controller which is coupled to said primary fuel supply system and to said actuator, said controller controlling said actuator to displace said governor actuating lever a sufficient amount to cause said liquid fuel supply system to supply an amount of liquid pilot fuel to said combustion cylinder commanded by said controller, said controller controlling said actuator and said primary fuel supply system to continue to supply both said primary gaseous fuel and said liquid pilot fuel to said cylinder during engine speed changes.

12. A method as defined in claim 11, further comprising automatically calibrating said system following said step D based upon sensed operating characteristics of said governor.

13. A method of converting an internal combustion engine from single fuel mode to dual fuel mode, said method comprising (A) providing an engine which is operable in single fuel mode and which includes
  (1) a combustion cylinder,
  (2) a liquid fuel supply system which supplies liquid fuel to said combustion cylinder and which includes a fuel pump, an electronically controlled fuel supply rack which is connected to said pump and which is electronically movable to vary the fuel delivery quantity per stroke of said pump, and an electronically controlled governor which sets the position of said rack to cause said pump to deliver fuel at a commanded quantity per stroke, said governor including an actuating lever a portion of which is positioned externally of said engine and the position of which determines the position of said rack; and
  (3) a throttle pedal which is mechanically coupled to said governor actuating lever;
(B) detaching said governor actuating lever from said throttle pedal;
(C) adding a primary fuel supply system which supplies a primary gaseous fuel to said combustion cylinder;
(D) adding an electronically controlled actuator and coupling said actuator to said portion of said governor actuating lever; and
(E) adding an electronic controller which is coupled to said primary fuel supply system and to said actuator, said controller controlling said actuator to displace said governor actuating lever a sufficient amount to cause said liquid fuel supply system to supply an amount of liquid pilot fuel to said combustion cylinder commanded by said controller, said controller controlling said actuator and said primary fuel supply system to continue to supply both said primary gaseous fuel and said pilot liquid fuel to said cylinder during engine speed changes.

14. A dual fuel engine comprising:
(A) a combustion cylinder;
(B) a primary fuel supply system which supplies a gaseous primary fuel to said combustion cylinder;
(C) a pilot fuel supply system which supplies a liquid pilot fuel to said combustion cylinder and which includes
  (1) a pump,
  (2) a rack which is connected to said pump and which is movable to vary the fuel delivery quantity per stroke of said pump, and
  (3) a governor which is connected to said rack, said governor including an actuating lever which is displaceable to set the position of said rack and a portion of which is positioned externally of said engine;
(D) an actuator which is coupled to said portion of said actuating lever; and
(E) an electric controller which is coupled to said primary fuel supply system and to said actuator, said controller causing said actuator to automatically displace said governor actuating lever to control the position of said rack and thus the fuel delivery quantity per stroke of said pump, said controller controlling said actuator and said primary fuel supply system to continue to supply both said primary gaseous fuel and said pilot liquid fuel to said cylinder during engine speed changes.

15. An engine as defined in claim 14, wherein said actuator comprises a piston and cylinder device.

16. An engine as defined in claim 15, wherein said piston and cylinder device is a hydrualic piston and cylinder device, and further comprising a valve supplying pressurized liquid to at least one side of the piston of said hydraulic piston and cylinder device.

17. An engine as defined in claim 14, further comprising
(A) a throttle pedal position sensor;
(B) a governor actuating lever position sensor;
(C) (1) an engine speed sensor; and
(D) a foot pedal position sensor, wherein said electronic control unit is coupled to said actuator, said foot pedal position sensor, said governor actuating lever position sensor, and said engine speed sensor.

18. A system for calibrating a pilot liquid fuel supply system of a dual fuel internal combustion engine, comprising
(A) means for determining governor actuating lever positions at designated liquid fuel delivery quantities per stroke;
(B) means for storing the determining positions and the designated liquid fuel delivery quantities per stroke in an electronic memory; and
(C) means for sensing engine speeds under engine operating conditions at which liquid fuel delivery quantities per stroke required to obtain said engine speeds are known, and wherein said means for storing comprises means for creating and storing in said memory a table of governor actuating lever position verse fuel delivery quantities per stroke and engine speeds.

19. A method comprising:
(A) providing an internal combustion engine which includes
  (1) a combustion cylinder,
  (2) a pilot fuel supply system which supplies a pilot liquid fuel to said combustion cylinder and which includes a pump and a fuel supply rack which is connected to said pump and which is movable to vary the fuel delivery quantity per stroke of said pump,
  (3) a primary fuel supply system which supplies a primary gaseous fuel to said combustion cylinder,
  (4) a mechanical governor which mechanically sets the position of said rack, said governor a) having a governor actuating lever the position of which determines the position of said rack and a portion of which is positioned externally of said engine b) being of a type which is designed to use a principle of governor droop to set said rack at a position required to cause an actual engine speed to approach a commanded engine speed,
  (5) an actuator coupled to said portion of said governor actuating lever,
  (6) a throttle pedal,
  (7) a throttle pedal position sensor coupled to said throttle pedal,
  (8) an engine speed sensor,
  (9) a governor actuating lever position sensor, and
  (10) an electronic controller coupled to said primary fuel supply system, said actuator, said throttle pedal position sensor, said governor actuating lever position sensor, and said engine speed sensor;

(B) commanding an engine operating speed using said throttle pedal sensor;

(C) sensing engine operating conditions, (D) electronically determining, based on said steps (B) and (C), a desired primary gaseous fuel delivery rate required for the commanded engine operating speed;

(E) electronically determining, based on said steps (B) and (C), a pilot liquid fuel delivery quantity per stroke required for the commanded engine operating condition;

(F) determining, based upon a prevailing sensed engine speed and upon a principle of governor droop, a governor actuating lever setting required to move said rack to a position which causes said pump to deliver said pilot liquid fuel at said desired quantity per stroke, (G) automatically and electronically controlling said primary fuel supply system to supply said primary gaseous fuel to said combustion cylinder at said desired primary gaseous fuel delivery rate;

(H) automatically and electronically controlling said actuator to displace said governor actuating lever into said required setting, wherein said steps (G) and (H) continue during engine speed changes.

* * * * *